(12) United States Patent
Goodwin

(10) Patent No.: US 8,091,199 B2
(45) Date of Patent: Jan. 10, 2012

(54) METHOD TO REPAIR PITCH CONTROL COMPONENTS

(75) Inventor: Kurt J. Goodwin, Greer, SC (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 12/406,986

(22) Filed: Mar. 19, 2009

(65) Prior Publication Data

US 2010/0139063 A1  Jun. 10, 2010

(51) Int. Cl.
*B23P 6/00* (2006.01)
*B23P 19/04* (2006.01)

(52) U.S. Cl. .......... 29/402.08; 29/402.01; 416/47; 416/155

(58) Field of Classification Search ........... 29/889.1, 29/402.01, 402.08; 416/47, 155
See application file for complete search history.

(56) References Cited

U.S. PATENT DOCUMENTS

| 7,331,761 | B2 | 2/2008 | Hansen et al. |
| 7,513,742 | B2 * | 4/2009 | Rogall et al. ............ 416/47 |
| 2007/0104577 | A1 | 5/2007 | Hansen et al. |
| 2008/0014088 | A1 | 1/2008 | Rogall |
| 2008/0159863 | A1 | 7/2008 | Uphues |
| 2008/0213095 | A1 | 9/2008 | Bech et al. |
| 2009/0022442 | A1 | 1/2009 | Bech et al. |

* cited by examiner

*Primary Examiner* — Richard Chang
(74) *Attorney, Agent, or Firm* — James W. Pemrick; Ernest G. Cusick; Frank A. Landgraff

(57) ABSTRACT

A method and system for repairing a wind turbine component in a wind turbine is provided. A damaged region of a drive assembly affects the wind turbine component. The method includes the steps of, providing a replacement wind turbine component, providing a mount for the replacement wind turbine component, and installing the replacement wind turbine component and mount in an undamaged region of the drive assembly. The replacement wind turbine component and mount are located to avoid interaction with the damaged region.

16 Claims, 5 Drawing Sheets

METHOD TO REPAIR PITCH CONTROL COMPONENTS

BACKGROUND OF THE INVENTION

This invention relates generally to wind turbines, and more specifically to repair of pitch control components.

At least some known wind turbines have pitch control systems comprised of a bearing coupled between a blade and a hub with a pitch motor positioning the blade attached to the bearing. The bearing may include a row of teeth that engage a gear of the motor. The motor's gear turns or pitches the blade by interacting with the teeth on the pitch bearing. Over time some of the bearing's teeth can become damaged, worn or may break off. Current known solutions to repair a pitch control component require the removal of the affected blade or the entire rotor. In either case, a large crane is required for removal, and cranes of this type are costly. In addition, the wind turbine is taken off-line until the repairs can be completed.

In some wind turbines, the blades are up to 60 meters in length, but may be designed to be up to 100 meters, so removal to change a damaged pitch control system can be costly and time consuming. Other known wind turbines are offshore, requiring extensive equipment to remove a blade and replace the pitch control system components. Wind turbines hub heights can be over 120 meters and in high winds, making it dangerous for workers to be on the wind turbines.

A malfunctioning pitch control system can also cause a blade to move out of a pitch setting such that the blades of the wind turbine asymmetrically load the hub and rotor shaft. If the rotor begins to move within the stator due to the asymmetric loading, there is a possibility of the rotor contacting the stator, for example, in direct drive application with the turbine rotor being attached directly to the generator. An electrical transient can occur if the rotor and stator contact, and the wind turbine may then have to be taken off-line.

BRIEF DESCRIPTION OF THE INVENTION

In one aspect of the present invention, a method for repairing a wind turbine component in a wind turbine is provided. A damaged region of a drive assembly affects the wind turbine component. The method includes the steps of, providing a replacement wind turbine component, providing a mount for the replacement wind turbine component, and installing the replacement wind turbine component and mount in an undamaged region of the drive assembly. The replacement wind turbine component and mount are located to avoid interaction with the damaged region.

In another aspect of the present invention, a method for repairing a wind turbine component in a wind turbine is provided. A damaged region of a drive assembly affects the wind turbine component. The method includes the steps of, providing a replacement wind turbine component, providing a mount for the replacement wind turbine component, installing the mount in a portion of the drive assembly, and installing the replacement wind turbine component on the mount. The replacement wind turbine component and mount are located to avoid interaction with the damaged region.

In still another aspect of the present invention, a system for repairing a wind turbine component in a wind turbine is provided. A damaged region of a drive assembly affects the wind turbine component. The system includes a replacement wind turbine component and a mount for the replacement wind turbine component. The replacement wind turbine component and mount are installed in a location of the drive assembly so as to avoid interaction with the damaged region.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of the wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
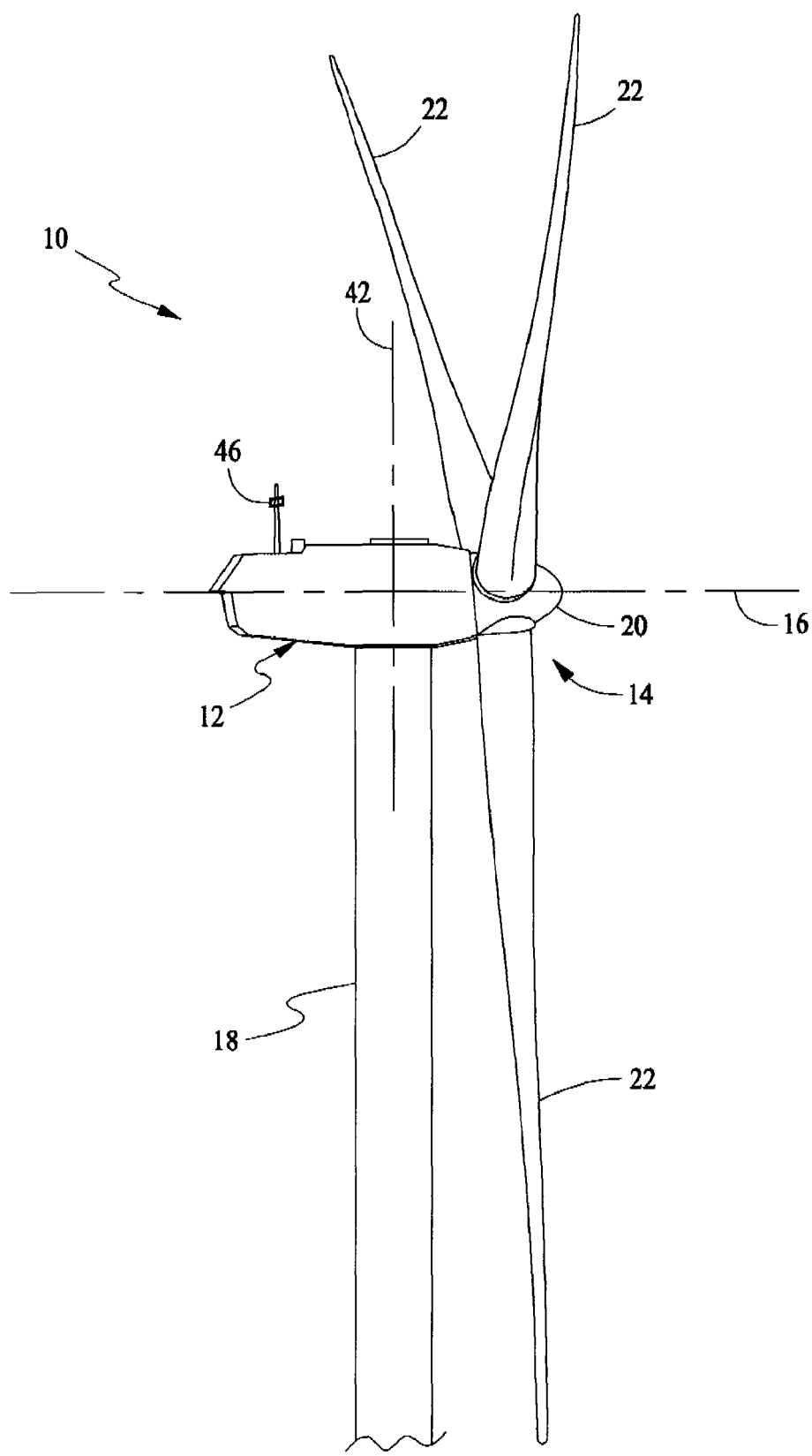
FIG. 1 is a perspective illustration of an exemplary wind turbine.

FIG. 1 is a perspective view of an exemplary embodiment of an exemplary wind turbine 10. Wind turbine 10 described and illustrated herein is a wind generator for generating electrical power from wind energy. In some known wind turbines, wind turbine 10 is any type of wind turbine, such as, but not limited to, a windmill (not shown). Moreover, wind turbine 10 described and illustrated herein includes a horizontal-axis configuration. In some known wind turbines, wind turbine 10 includes a vertical-axis configuration (not shown). Wind turbine 10 may be coupled to an electrical load (not shown), such as, but not limited to, a power grid (not shown), and may receive electrical power therefrom to drive operation of wind turbine 10 and/or its associated components and/or may supply electrical power generated by wind turbine 10. Although only one wind turbine 10 is shown in FIGS. 1-3, in some embodiments a plurality of wind turbines 10 are grouped together, to form a "wind farm".

Wind turbine 10 includes a body 12, sometimes referred to as a "nacelle", and a rotor (generally designated by 14) coupled to body 12 for rotation with respect to body 12 about an axis of rotation 16. In the exemplary embodiment, nacelle 12 is mounted on a tower 18. The height of tower 18 is any suitable height enabling wind turbine 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may include any number of blades 22.

Figure 2:
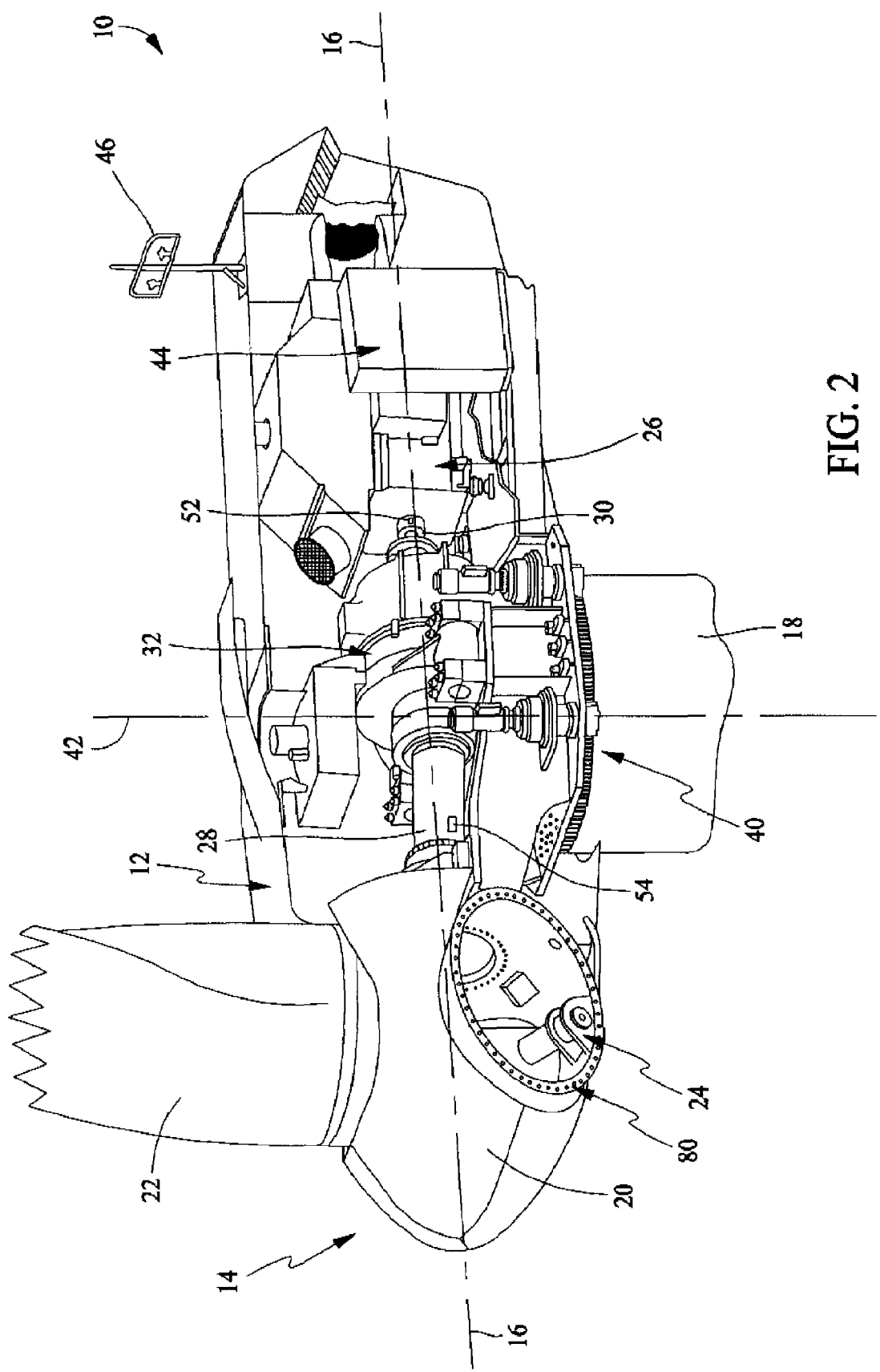
FIG. 2 is a partially cut-away perspective illustration of a portion of the wind turbine shown in FIG. 1.
Figure 3:
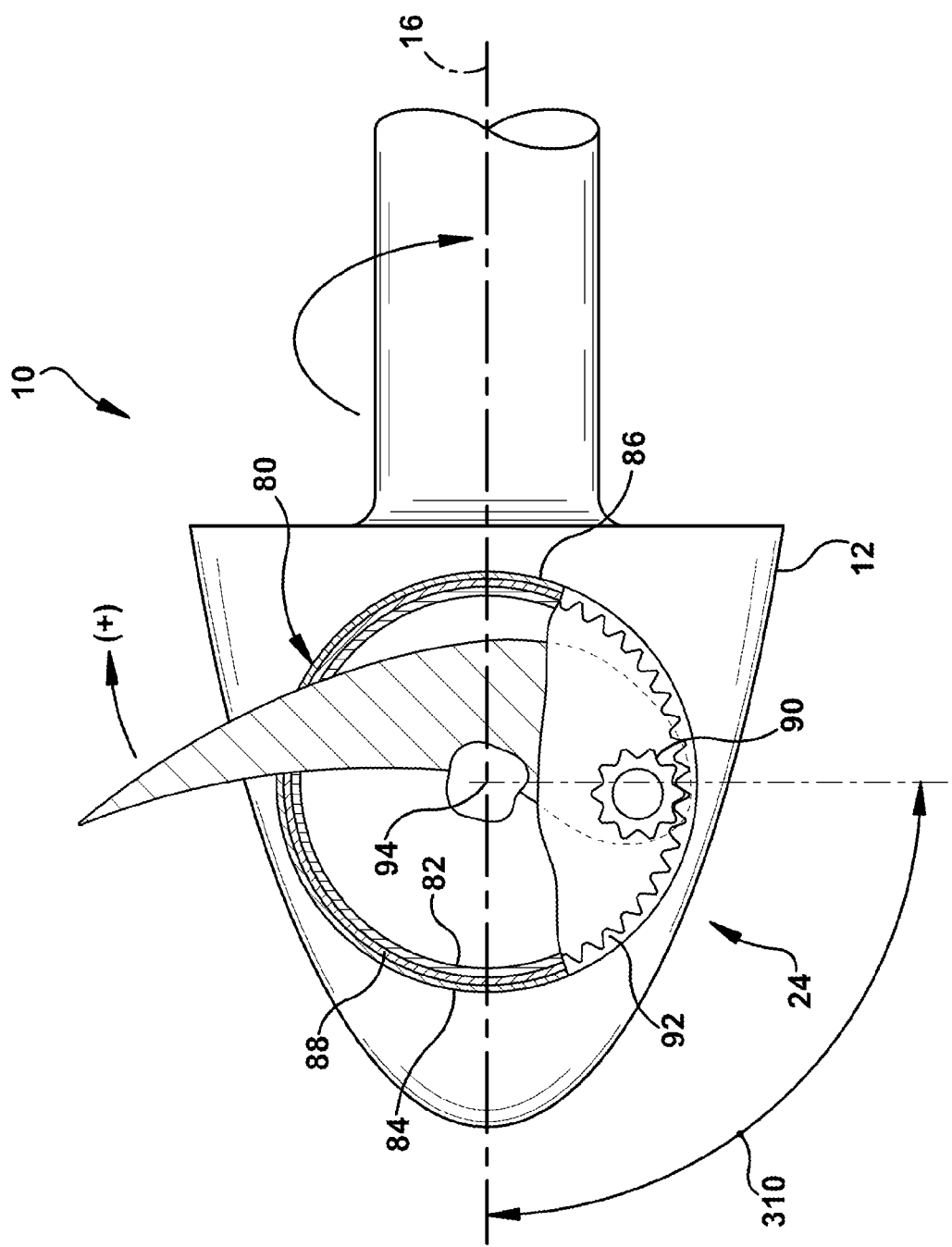
FIG. 3 is a cross-sectional view illustration of a portion of a rotor hub of the wind turbine shown in FIGS. 1-2 illustrating an exemplary embodiment of a pitch system.

FIG. 2 is a partially cut-away perspective view of a portion of an exemplary wind turbine 10. Wind turbine 10 includes an electrical generator 26 coupled to rotor 14 for generating electrical power from the rotational energy generated by rotor 14. Generator 26 is any suitable type of electrical generator, such as, but not limited to, a wound rotor induction or permanent magnet generator. Rotor 14 includes a rotor shaft 28 coupled to rotor hub 20 for rotation therewith. Generator 26 is coupled to rotor shaft 28 such that rotation of rotor shaft 28 drives rotation of the generator rotor, and therefore operation of generator 26. In the exemplary embodiment, the generator rotor has a rotor shaft 30 coupled thereto and coupled to rotor shaft 28 such that rotation of rotor shaft 28 drives rotation of the generator rotor. In the exemplary embodiment, generator rotor shaft 30 is coupled to rotor shaft 28 through a gearbox 32, although in other embodiments generator rotor shaft 30 is coupled directly to rotor shaft 28. The rotation of rotor 14 drives the generator rotor to thereby generate variable frequency AC electrical power from rotation of rotor 14.

In some embodiments, wind turbine 10 includes a brake system (not shown) for braking rotation of rotor 14. Furthermore, in some embodiments, wind turbine 10 includes a yaw system 40 for rotating nacelle 12 about an axis of rotation 42 to change a yaw of rotor 14. Yaw system 40 is coupled to and controlled by a control system(s) 44. In some embodiments, wind turbine 10 includes anemometry 46 for measuring wind speed and/or wind direction. Anemometry 46 is coupled to control system(s) 44 for sending measurements to control system(s) 44 for processing thereof. In the exemplary embodiment, control system(s) 44 is mounted within nacelle 12. Alternatively, one or more control systems 44 may be remote from nacelle 12 and/or other components of wind turbine 10. Control system(s) 44 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

FIG. 3 is a cross-sectional view of a portion of hub 20 illustrating an exemplary embodiment of a pitch system 24. Wind turbine 10 includes variable blade pitch system 24 for controlling a pitch angle of rotor blades 22 with respect to a wind direction. Pitch system 24 is coupled to control system(s) 44 for control thereby. Blade 22 and pitch system 24 are coupled to bearing 80 housed in hub 20. Bearing 80 has an inner race 82 and a concentric outer race 84. Inner race 82 is coupled to blade 22 and outer race 84 is coupled to pitch system 24. An annular groove 86 is defined between inner race 82 and outer race 84 and includes at least one material 88 which reduces friction when inner race 82 and outer race 84 move with respect to each other. Material 88 is at least one of rollers or balls (not shown) or a lubricant (not shown). Alternatively, blade 22 is coupled to outer race 84, and inner race 82 is coupled to hub 20 wherein pitch system 24 drives outer race 84 to control the position of blade 22.

In some embodiments, pitch system 24 includes one or more actuators. The pitch actuators include any suitable structure, configuration, arrangement, means, and/or components, such as, but not limited to, electrical motors, hydraulic cylinders, springs, and/or servomechanisms. Moreover, the pitch actuators are driven by any suitable means, such as, but not limited to, hydraulic fluid, electrical power, electrochemical power, and/or mechanical power, such as, but not limited to, spring force. In some embodiments, the pitch actuators are driven by energy extracted from at least one of a rotational inertia of rotor 14 and a stored energy source (not shown) that supplies energy to components of wind turbine 10. In the exemplary embodiment, pitch system 24 includes a pitch drive gear 90 and a toothed pitch ring gear 92 coupled to hub 20 and blades 22 via bearing 80. Pitch system 24 utilizes actuators for changing the pitch angle of blades 22 by rotating blades 22 coupled to inner race 82 with respect to hub 20 and outer race 84. More specifically, in the exemplary embodiment, the pitch actuators include a pitch drive gear 90 that is coupled to a pitch ring gear 92. Pitch ring gear 92 is coupled to blade 22 such that rotation of pitch drive gear 90 rotates blade 22 about an axis of rotation 94 to thereby change the pitch of blade 22.

As described earlier, the teeth of pitch ring gear 92 can become damaged or worn, no longer providing the correct functionality. Known repairs for this issue involve replacing or turning the pitch bearing to engage the pitch drive pinion with undamaged gear teeth. To change the bearing, the blade and or rotor must be removed, resulting in a difficult and costly operation involving high capacity cranes with high reaches.

Figure 4:
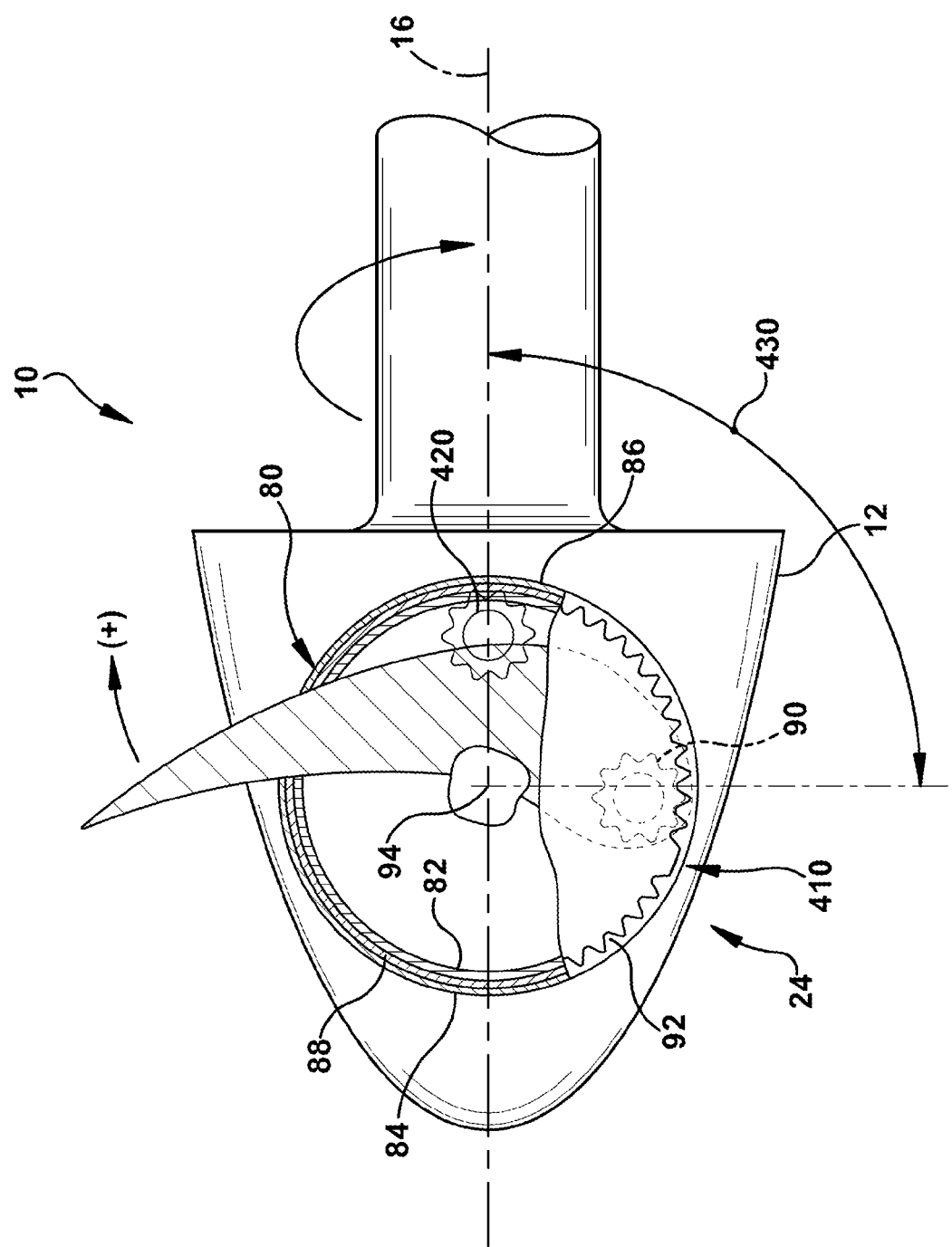
FIG. 4 is a is a cross-sectional view illustration of a portion of a rotor hub of the wind turbine shown in FIGS. 1-2 illustrating an exemplary embodiment of a repaired pitch system.

The method and system, according to aspects of the present invention, include providing a pitch drive mount that can be brought up into the hub and attached to the hub either using self-fixturing or separate tooling to drill and tap mounting holes in the hub, thus enabling a pitch drive to be applied to one of the undamaged section of the pitch ring gear teeth. Typically, only about one quadrant 310 of the pitch ring gear teeth are actually driven by the pitch drive gear 90, and often the damage is restricted to less than that, sometimes only one to a few teeth. The method of the present invention enables several repairs over the life of the turbine without ever having to drop the rotor or reposition the bearing FIG. 4 is a cross-sectional view of a portion of hub 20 illustrating an exemplary embodiment of a repaired pitch system 24, according to aspects of the present invention. A damaged region 410 of the pitch ring gear 92, can be avoided by moving the pitch drive gear to a new quadrant or section of the pitch ring gear 92. In this embodiment a new pitch drive gear 420 has been moved to a position within quadrant 430. Only the ring gear teeth in quadrant 430 will be used in this example, thereby avoiding the damaged region 410. It is to be understood that other quadrants or other incremental changes within the same quadrant could be employed as new positions for the pitch drive gear 420, as long as the damaged region 410 is avoided. As non-limiting examples, the pitch drive gear 420 could be moved at least 15 degrees or at least 45 degrees away from the original position of pitch drive gear 90. In addition, the pitch drive gear 90 could be moved to the new location or a replacement pitch drive gear 420 and/or motor could be installed in a new location.

The pitch drive is typically permanently mounted in the hub, set to properly bear on the pitch ring gear teeth correctly in line, and often incorporates a sensor or sensors (not shown) to feedback bearing position and stops for the rotation of blade 22. The mount for the replacement pitch drive can incorporate the ability to pick up the sensor(s) and stops, and can include locating features to ensure good engagement of the pinion and adjustment capability for the backlash and internal clearance. These features may be included with a housing that is designed to fit within the hub curvature. Mounting holes may be provided that can be used to bolt into the hub. Drilling and tapping the mounts for the housing in the hub can be done using the housing for fixturing or a separate fixturing tool that picks up on the same curvature and flange on the hub as it will finally mount to.

Figure 5:
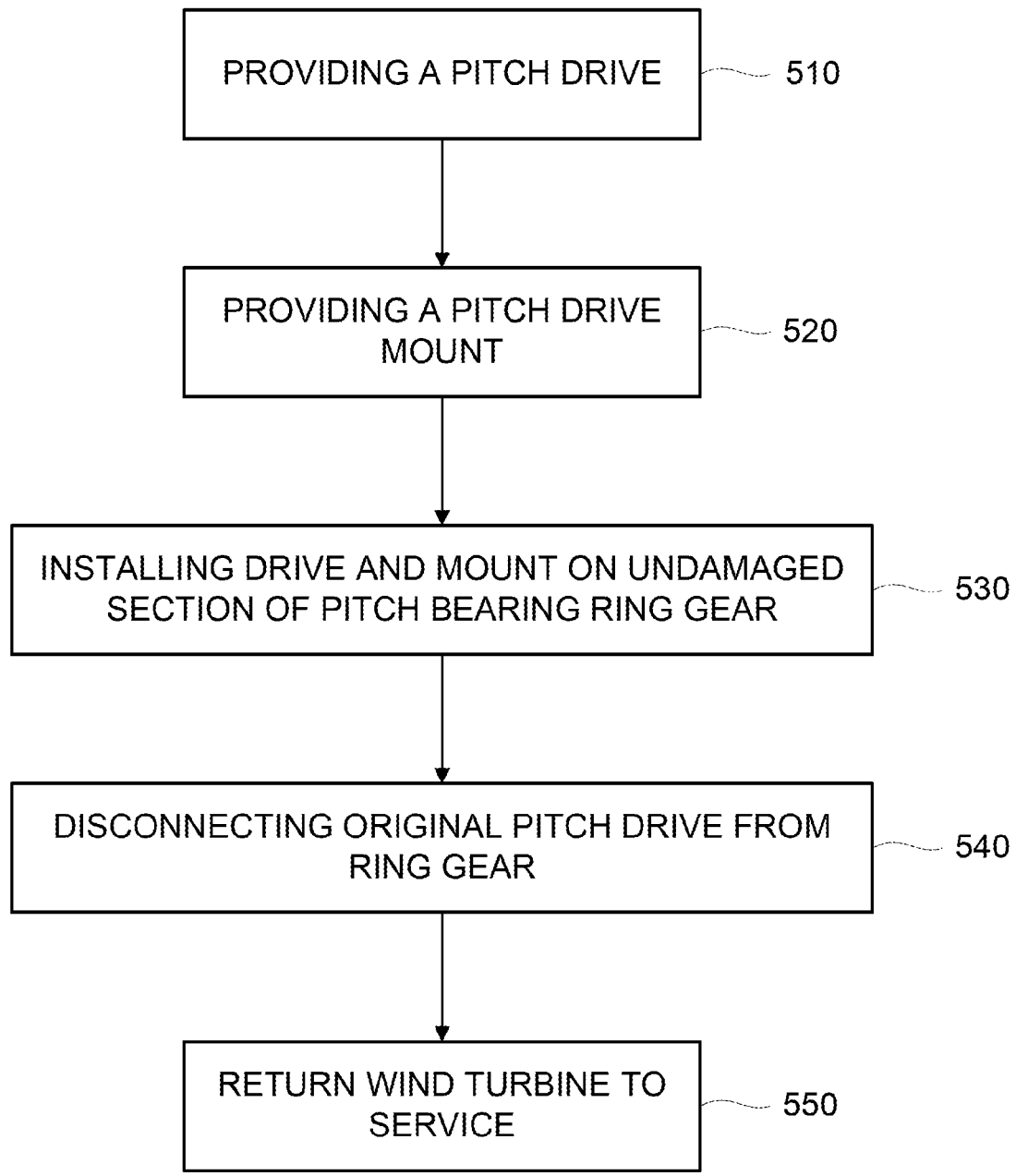
FIG. 5 is a flowchart illustrating steps of the method to repair a wind turbine component, according to aspects of the present invention.

FIG. 5 illustrates an exemplary method, according to the present invention, which may comprise the following steps:

Providing a pitch drive at step 510. The pitch drive may include the existing drive or a replacement drive.

Providing a pitch drive mount at step 520. The mount may be an existing mount or a replacement mount.

Installing the original or replacement pitch drive and mount on an undamaged region of the pitch bearing ring gear at step 530. This step 530 can include installing the drive and mount in a new quadrant or in a new location that avoids use of the damaged section of ring gear teeth.

Disconnecting the original pitch drive from the ring gear at step 540. If the original pitch motor and/or gear are to be used in the new location this step may be performed before steps 510-530.

Returning the wind turbine to service at step 550. This is an optional step and can be performed as desired.

The above-described method and system to repair pitch control components facilitate repairs required by the blade pitch system. The exemplary embodiment is a cost-effective way to repair a pitch control system in a wind turbine. Furthermore, the exemplary embodiment of repairing pitch control components minimizes or eliminates the use of a large crane, reduces the need for dangerous and expensive maintenance work on the turbine, and decreases the time required for repairs to minimize the amount of time a wind turbine is off-line.

The apparatus is not limited to the specific embodiments described herein, but rather, components of the method may be utilized independently and separately from other components described herein. For example, the repair process may also be used with other control systems for controlling bearings (e.g., yaw), and is not limited to practice with only wind turbine blade assemblies as described herein. Rather, the present invention can be implemented and utilized in connection with many other pitch or yaw applications.

While the invention has been described in terms of various specific embodiments, those skilled in the art will recognize that the invention can be practiced with modification within the spirit and scope of the claims.

What is claimed is:

1. A method for providing a repair for a wind turbine component in a wind turbine, said wind turbine component affected by a damaged region of a drive assembly, said method comprising:
   providing a replacement wind turbine component, the replacement wind turbine component providing the same functionality as the wind turbine component;
   providing a mount for said replacement wind turbine component;
   installing said replacement wind turbine component and said mount in an undamaged region of said drive assembly after said wind turbine component affected by the damaged region;
   wherein, the wind turbine component drives about one first quadrant of a ring gear, and said replacement wind turbine component and said mount are located in a second quadrant of the ring gear, so that the replacement wind turbine component drives about the second quadrant of the ring gear, and contact between the replacement wind turbine component and the damaged region is restricted.

2. The method in accordance with claim 1, wherein the drive assembly is part of a pitch drive or part of a yaw system in the wind turbine.

3. The method in accordance with claim 2, wherein the replacement wind turbine component is comprised of at least one of:
   a gear and a motor.

4. The method in accordance with claim 2, wherein the damaged region is a portion of a ring gear of said pitch or yaw system.

5. The method in accordance with claim 1, wherein said installing said replacement wind turbine component and said mount step, further includes positioning said replacement wind turbine component and said mount about 90 degrees away from an original position of said wind turbine component.

6. The method in accordance with claim 1, wherein said installing said replacement wind turbine component and said mount step, further includes positioning said replacement wind turbine component and said mount at least about 45 degrees away from an original position of said wind turbine component.

7. The method in accordance with claim 1, wherein said installing said replacement wind turbine component and said mount step, further includes positioning said replacement wind turbine component and said mount at least about 15 degrees away from an original position of said wind turbine component.

8. The method in accordance with claim 1, further comprising the step of:
   returning said wind turbine to service subsequent to said installing step.

9. A method for providing a repair for a wind turbine component in a wind turbine, said wind turbine component affected by a damaged region of a drive assembly, said method comprising:
   providing a replacement wind turbine component, the replacement wind turbine component providing the same functionality as the wind turbine component;
   providing a mount for said replacement wind turbine component;
   installing said mount in a portion of said drive assembly;
   installing said replacement wind turbine component on said mount after said wind turbine component affected by the damaged region;
   wherein, the wind turbine component drives about one first quadrant of a ring gear, and said replacement wind turbine component and said mount are located in a second quadrant of the ring gear, so that the replacement wind turbine component drives about the second quadrant of the ring gear, and contact between the replacement wind turbine component and the damaged region is restricted.

10. The method in accordance with claim 9, wherein the drive assembly is part of a pitch drive or part of a yaw system in the wind turbine.

11. The method in accordance with claim 10, wherein the replacement wind turbine component is comprised of at least one of:
    a gear and a motor.

12. The method in accordance with claim 10, wherein the damaged region is a portion of a ring gear of said pitch or yaw system.

13. The method in accordance with claim 9, wherein said installing said replacement wind turbine component step, further includes positioning said replacement wind turbine component and said mount about 90 degrees away from an original position of said wind turbine component.

14. The method in accordance with claim 9, wherein said installing said replacement wind turbine component step, further includes positioning said replacement wind turbine component and said mount at least about 45 degrees away from an original position of said wind turbine component.

15. The method in accordance with claim 9, wherein said installing said replacement wind turbine component step, further includes positioning said replacement wind turbine component and said mount at least about 15 degrees away from an original position of said wind turbine component.

16. The method in accordance with claim 9, further comprising the step of:
    returning said wind turbine to service subsequent to said installing step.

\* \* \* \* \*